United States Patent [19]

Reed et al.

[11] Patent Number: 4,536,879
[45] Date of Patent: Aug. 20, 1985

[54] PYROTECHNIC LAMP

[75] Inventors: Cathy J. Reed, Nashua; Thomas M. Pollak, Amherst, both of N.H.

[73] Assignee: Sanders Associates, Inc., Nashua, N.H.

[21] Appl. No.: 524,804

[22] Filed: Aug. 19, 1983

[51] Int. Cl.³ .............................................. H01S 3/091
[52] U.S. Cl. ........................................ 372/77; 372/72
[58] Field of Search ........................ 372/77, 72, 69, 78

[56] References Cited

U.S. PATENT DOCUMENTS 3,836,865  9/1974  Koehler et al. ........................ 372/77
4,371,969  1/1983  Chicklis et al. ........................ 372/77

Primary Examiner—William L. Sikes
Assistant Examiner—Léon Scott, Jr.
Attorney, Agent, or Firm—Louis Etlinger; Richard I. Seligman

[57] ABSTRACT

A long-life pyrotechnic lamp particularly suited for use in a compact, low-cost laser employing a solid-state laser rod which is pumped by the optical radiation of a pyrotechnic lamp employing the direct combustion of a metal in a flowing oxygen-containing atmosphere. The metal is supported on and heated to ignition by a graphite rod. The metal comprises a cylinder having a centered longitudinal bore adapted to receive the rod therein and has its outer surface serrated or finned to greatly increase the surface area. In one embodiment, the fins are helical about the outer surface. In another embodiment, the outer surface of the metal is longitudinally slit. In both cases, the metal is subsequently sliced into segments.

14 Claims, 7 Drawing Figures

PYROTECHNIC LAMP

The invention herein described was made in the course of or under a contract or subcontract thereunder with the Department of the Air Force.

BACKGROUND OF THE INVENTION

This invention relates to pyrotechnic lamps and more particularly, to lasers utilizing the radiation generated from certain exothermic, pyrotechnic reactions to directly pump the laser rod.

In U.S. Pat. No. 4,371,969 entitled "LOW-COST LASER", by Evan Chicklis and James Mosto, also assigned to the common assignee of this application, there is described a low-cost, compact laser in which a solid state laser rod is pumped by a pump source consisting of the burning of a pure metal in a flowing oxygen atmosphere. In one embodiment, the pump source comprises a zirconium metal foul wound about a graphite rod and enclosed in a tube to which flowing oxygen is admitted. Ignition of the metal foil is achieved by applying a large current to the graphite rod. The pump described therein is relatively compact, has minimum smoke and soot associated therewith, and permits laser operation in excess of one second.

Such a laser is shown in FIG. 1, which generally corresponds to the single figure of the above-mentioned Chicklis/Mosto patent. As shown therein, the low-cost laser includes a laser rod assembly 10, including a laser rod 11 of one of several materials well known to those skilled in the art. The ends of the laser rod 11 are coated to provide the reflective and partially reflective mirrors for the laser cavity in the usual manner. Optionally, of course, separate mirrors could be provided. The laser rod 11 is disposed within a transparent tube 12, typically of quartz. End caps 14 and 16 are provided at the end of case 12 and have holes therein to accommodate stems 18 and 20. The functions of the stems 18 and 20 is to allow a coolant to be supplied to the tube 12 to cool the laser rod 11, if required.

Positioned next to the laser rod assembly 10 is the pump source 22 therefor. In the apparatus of the Chicklis/Mosto patent, the pump is a pyrotechnic lamp comprising a composite rod 24 disposed within a transparent tube 26, also made of quartz. As shown in greater detail in the cross-section of FIG. 2, the rod 24 comprises a graphite rod 25 having zirconium metal foil 27 wrapped thereabout. The ends of the tubes 26 have end caps 28 and 30 thereon for accommodating stems 32 and 34 to allow flowing oxygen to be applied to the tube 26. The graphite rod 25 is secured within graphite terminals 35 positioned within the end caps 28 and 30 and preferably held therein with a set screw, not shown.

The metal foil 27 is described as being preferably spiral wrapped about a rod and then slipped over the graphite rod 25 before the graphite terminals 35 are attached by press-fitting to each end of the graphite rod. As thus constructed, the spiral wrapped foil cylinder 27 is free to move on the graphite rod 25 but is limited by the graphite terminals 35 at each end.

The laser rod assembly 10 and the pump source 22 are disposed within a housing comprising an upper housing portion 36 and a lower housing portion 38. These portions are of metal and are fastened together by screws 40. The interior portions 42 and 44 of the upper 38 and lower 36 housing portions are reflective, which collect and image radiation from the pump source 22 onto the laser rod 11. The housing also includes two end sections 46 (only one of which is shown in the figure). The end sections are fastened to the lower and upper housing portions 36, 38 by means of screws 48. The end sections have holes 50, 52 therein for accommodating the stems 18, 20, 32 and 34.

For an expendable laser, the flowing oxygen can be supplied by a cartridge or chemical oxygen source (such as $KClO_4$) attached to stem 34. Inert gases may also be added to the flowing gas stream as the applicants have found that they increase produced obscurant removal. When the metal foil is ignited by applying an electrical current to the graphite rod (or by using a separate squib) it is burned in the oxygen environment outputting a sufficient amount of optical radiation to pump the laser rod 10, such that laser radiation is emitted from hole 52 in the end section.

The pyrotechnic lamp as employed in the above-described, low-cost laser can also be used for other purposes. In many applications, however, it has certain drawbacks which would make it more desirable if corrected. For one, the optical radiation output of the wrapped foil is not reproduceable. Moreover, a longer and more reproduceable burn duration as well as more uniform heating and ignition, coupled with less energy required for ignition, would be desirable. Additionally, it has been found that in some instances, part of the zirconium melts down to the quartz tube 26 and destroys the envelope.

Wherefore, it is the object of the present invention to provide an improved pyrotechnic lamp for use within an environment such as the low-cost laser of Chicklis/Mosto or in other separate applications which eliminates the above-described shortcomings of a pyrotechnic lamp employing zirconium metal foil wrapped about a graphite rod within a quartz tube, and the like, such as zirconium powder/pellet pumped lasers.

SUMMARY

The foregoing objective has been met by the pyrotechnic lamp of the present invention wherein the metal mounted on the graphite rod comprises a cylinder having a centered longitudinal bore adapted to receive the rod therein and wherein, further, the outer surface of the cylinder is serrated or finned to increase the surface area; and, additionally, the metal source is made of multiple metal pieces rather than one metal foil wrap.

In one embodiment, the cylinder has helical fins. In a second embodiment, the cylinder has longitudinal slots in the outer surface forming the fins.

In another embodiment, the segments or pieces closer to the center of the rod are thinner and of smaller diameter than those closer to the ends.

DESCRIPTION OF THE PREFERRED AND ALTERNATE EMBODIMENTS

Figure 1:
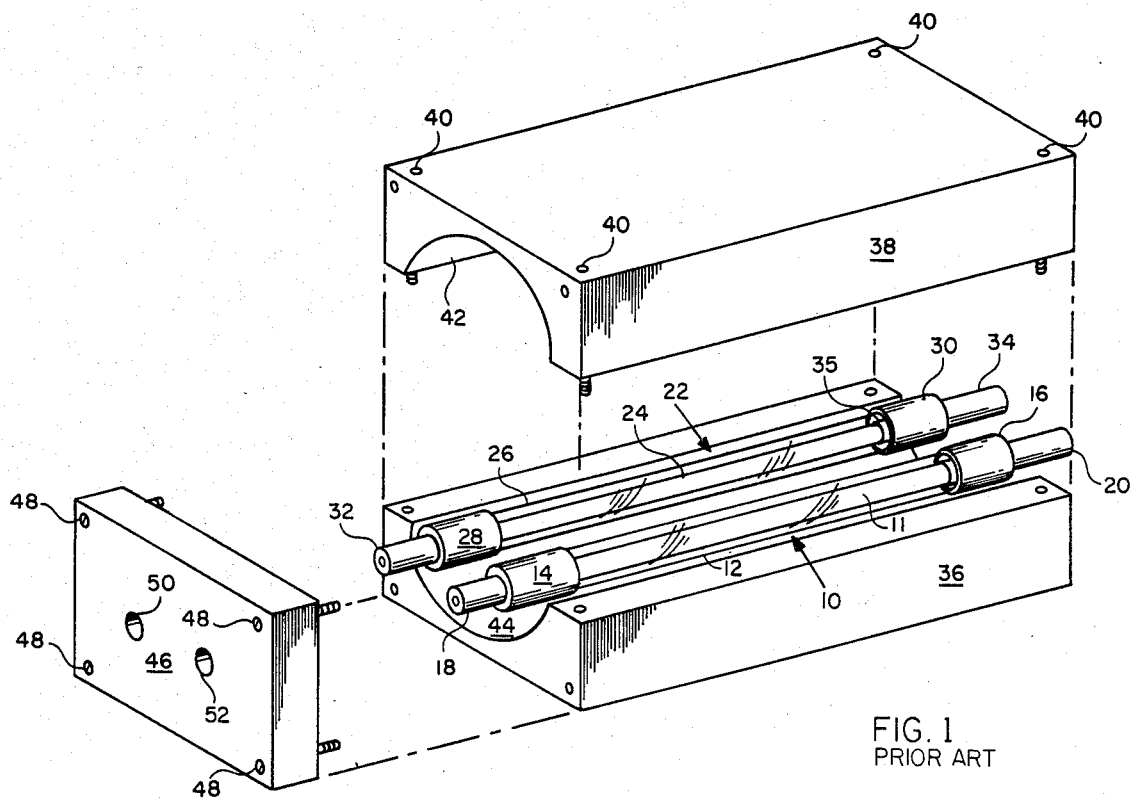
FIG. 1 is an exploded view in perspective of a low-cost laser as wherein the pyrotechnic lamp of the present invention can be put to good advantage.
Figure 2:
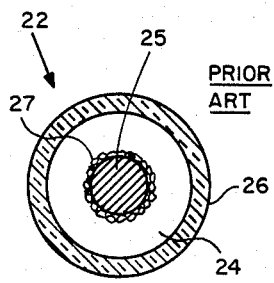
FIG. 2 is a cutaway section through the pump source 22 of a low-cost laser such as that of FIG. 1 according to a prior art configuration thereof.

As will be recalled from the description with respect to FIGS. 1 and 2, the combusted metal of the pyrotechnic lamp employed therein was in the form of a metal foil wrapped about a graphite rod. In the improved pyrotechnic lamp of the present invention, the graphite rod and quartz tube, 25, 26, respectively, of FIG. 2, remain substantially the same. To effect the benefits of the present invention, it is the form of the metal which is changed. While zirconium metal is preferred, as with the above-referenced Chicklis/Mosto patent and its invention, other metals such as thorium could be used as well.

Figure 3:
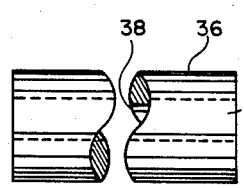
FIG. 3 is a drawing of a longitudinally bored zirconium rod from which the metal portion of the pyrotechnic lamp of the present invention is formed.

As shown in FIG. 3, to construct the metal portion according to the present invention, a metal cylindrical rod 36 is employed. Rod 36 is first bored longitudinally along its center line to form a bore 38 adapted to receive the graphite rod 25 therein.

Figure 4:
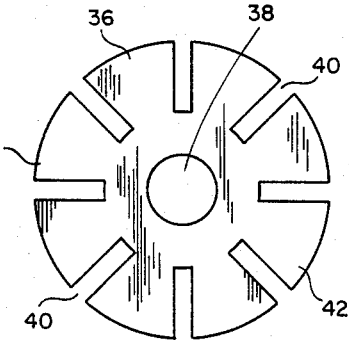
FIG. 4 is an end view of the cylinder of FIG. 3 after it has been longitudinally grooved to form fins in the outer surface thereof.
Figure 5:
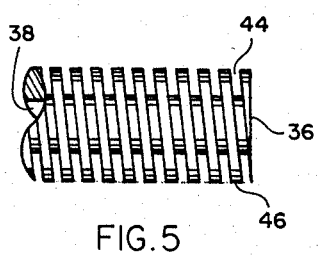
FIG. 5 shows the rod of FIG. 3 after it has been helically grooved to form helical fins in the outer surface thereof according to an alternate embodiment.
Figure 6:
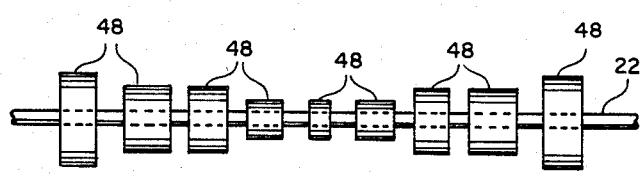
FIG. 6 is a simplified drawing showing finned cylindrical segments of metal rod spaced on a graphite rod in a preferred mode of assembly of the present invention.
Figure 7:
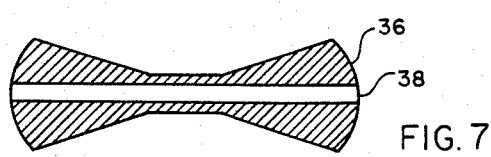
FIG. 7 is a cutaway view through an alternate configuration for the metal employed in the present invention.

Turning next to FIG. 4, the rod 36 is then slotted longitudinally along the length thereof to form equal radially spaced slots along the length thereof. By longitudinally slotting the rod 36 as shown, serrations or fins 42 are formed between the slots 40. Optionally, as shown in FIG. 5, a helical slot 44 can be formed in the outer surface of the rod 36 along the length thereof to create a helical fin 46 along its length. In either case, the effective surface area is greatly increased. Finally, the finned rod 36 is sliced into segments 48 which are placed onto the graphite rod 25. In one embodiment, the cylindrical segments 48 employed are from different diameter rods 36 and are disposed in spaced relationship as shown in FIG. 6 with smaller thicknesses and smaller diameters towards the center of the rod 25 with increasing thicknesses and diameters of the segments 48 closer to the ends of the rod 25. This configuration has given indications that it may afford improved burning characteristics in preliminary tests performed by the inventors herein. As another possibility, the finned rod configuration of FIG. 4 can be left of unitary construction and can be shaped as shown in cross-section in FIG. 7 with a gradually increasing taper towards the outer ends.

Wherefore, having thus described our invention, we claim:

1. In a pyrotechnic lamp including a metal whose combustion in oxygen occurs at sufficiently high temperatures to produce optical radiation, a source of oxygen which will maintain combustion of the metal, means for providing a sustained flow of the oxygen past the metal, and, a rod for supporting and igniting the metal, the improvement for providing extended burn duration, uniform heating and ignition, and reproduceable optical radiation comprising:
the metal is a symmetrical member having a centered longitudinal bore adapted to receive the rod therein and having the outer surface thereof finned.

2. The improvement to a pyrotechnic lamp of claim 1 wherein:
said member is cylindrical and has a helical fin.

3. The improvement to a pyrotechnic lamp of claim 1 wherein:
said member is cylindrical and has longitudinal slots in said outer surface forming said fins.

4. The improvement to a pyrotechnic lamp of claim 1 wherein:
said member comprises a plurality of segments.

5. The improvement to a pyrotechnic lamp of claim 1 wherein:
said segments are thicker and of greater diameter adjacent the ends of the rod than adjacent the center thereof.

6. The improvement to a pyrotechnic lamp of claim 5 wherein:
said segments are cylindrical.

7. The improvement to a pyrotechnic lamp of claim 1 wherein:
said member is thicker and of greater diameter adjacent the ends of the rod than adjacent the center thereof.

8. In a laser comprising a resonant cavity including a solid-state laser rod; means for abstracting energy from the cavity; and pumping means for pumping the laser rod, the pumping means including a solid metal whose combustion in oxygen occurs at sufficiently high temperatures so that the ensuing optical radiation will maintain oscillations in the laser rod, a source of oxygen which will maintain combustion of the metal, means for providing a sustaining flow of oxygen past the metal, and means for igniting the metal, the improvement for providing extended burn duration, uniform heating and ignition, and reproduceable optical radiation from the pumping means comprising:
the metal comprising a symmetrical member having a centered longitudinal bore adapted to receive the rod therein, the outer surface of said member being finned.

9. The improvement to a laser of claim 8 wherein:
said member is cylindrical and has a helical fin.

10. The improvement to a laser of claim 8 wherein:
said member is cylindrical and has longitudinal slots in said outer surface forming said fins.

11. The improvement to a laser of claim 8 wherein:
said member comprises a plurality of segments.

12. The improvement to a laser of claim 8 wherein:
said segments are thicker and of greater diameter adjacent the ends of the rod than adjacent the center thereof.

13. The improvement to a laser of claim 12 wherein:
said segments are cylindrical.

14. The improvement to a laser of claim 8 wherein:
said member is thicker and of greater diameter adjacent the ends of the rod than adjacent the center thereof.

* * * * *